United States Patent [19]

Angehrn

[11] 4,047,430
[45] Sept. 13, 1977

[54] METHOD AND APPARATUS FOR LOGGING EARTH BOREHOLES USING SELF-CONTAINED LOGGING INSTRUMENT

[75] Inventor: Jorg August Angehrn, Houston, Tex.

[73] Assignee: Dresser Industries, Inc., Dallas, Tex.

[21] Appl. No.: 710,974

[22] Filed: Aug. 2, 1976

Related U.S. Application Data

[63] Continuation-in-part of Ser. No. 682,940, May 3, 1976.

[51] Int. Cl.² ............................................. E21B 47/00
[52] U.S. Cl. ..................................................... 73/151
[58] Field of Search .......................... 73/151, 152, 514

[56] References Cited

U.S. PATENT DOCUMENTS

| | | | |
|---|---|---|---|
| 3,490,149 | 1/1970 | Bowers | 73/151 X |
| 3,545,266 | 12/1970 | Wilson | 73/151 |

*Primary Examiner*—Jerry W. Myracle
*Attorney, Agent, or Firm*—William E. Johnson, Jr.

[57] ABSTRACT

A self-contained, battery powered well logging instrument is pumped down the interior of a drill pipe string having a catcher sub at its lower end. When the logging instrument latches into the catcher sub, the pumped fluid circulation is blocked, after which increased pump pressure switches a valve assembly to recreate circulation and energize the logging instrument to the standby position. An accelerometer in the logging instrument detects the upward movement of the instrument and switches the circuitry from standby to the record mode. The output from a clock controlled by the downhole accelerometer is recorded along with the logging information and is synchronized with pipe footage measurements and with a similar such accelerometer and clock at the earth's surface which are responsive to the movement of the pipe string at the earth's surface. The recorded logging samples are thus related to true depth by correlating with the data simultaneously recorded at the earth's surface. As an alternative embodiment, the logging instrument is attached to the drill pipe prior to running the pipe into the borehole. As an additional embodiment, a logging instrument is provided having a variable output accelerometer and associated circuitry which provides depth information independently of the equipment at the earth's surface.

8 Claims, 12 Drawing Figures

METHOD AND APPARATUS FOR LOGGING EARTH BOREHOLES USING SELF-CONTAINED LOGGING INSTRUMENT

RELATED APPLICATION

This application is a continuation-in-part of United States Application Ser. No. 682,940, filed May 3, 1976, for "Method and Apparatus for Logging Earth Boreholes Using Self-Contained Logging Instrument".

BACKGROUND OF THE INVENTION

This invention relates generally to methods and apparatus for logging earth boreholes and specifically to methods and apparatus utilizing self-contained well logging instruments in earth boreholes.

It has become relatively common within the last few years to drill wells in the search for oil and gas and the like with a portion of the bore deviating from the usual vertical orientation thereof. The deviation of inclination may extend for a considerable distance at angles ranging to 70°, sometimes returning to the usual vertical orientation. In some instances, such boreholes may even extend past 90° from the vertical and actually be extending in the "up" direction for some distance.

It is also well known in the art of drilling such wells to attempt the logging of the formations surrounding such boreholes with logging instruments run into the well bore on a wireline and/or cable to perform various operations. Such tools usually depend upon the force of gravity to permit positioning of the well tools at the desired formation in the well bore.

Manifestly, the relatively horizontal angle of the deviated portion of the well bore will not permit the wireline-actuated tools to move into the lower portion of the well bore since friction of the well tool in the deviated portion works against the force of gravity. Thus, it has become essential to provide some means of causing the well logging instrument to pass through the deviated portions of the well bore.

Another problem associated with such boreholes relates to the instability of some formations penetrated by the well bore, thus causing borehole diameter changes, some very abrupt. Ledges are formed and the logging instrument lodges against them.

Furthermore, although there have been attempts in the prior art to pump logging instruments down the borehole, such instruments have generally suffered from the problems associated with having a wireline attached to the instrument, or because of having no correlation between the well logging signals and the true depth in the borehole.

It is therefore the primary object of the present invention to provide a new and improved method and apparatus for logging earth boreholes;

It is also an object of the present invention to provide new and improved method and apparatus for logging deviated boreholes requiring no wireline from the earth's surface;

It is yet another object of the present invention to provide new and improved method and apparatus for logging earth boreholes and for correlating the logging data with the true depth in the borehole.

The objects of the invention are accomplished, generally, by apparatus having means to measure the acceleration of the apparatus while traversing an earth borehole, means to convert such acceleration to indications of depth in the borehole, means for providing indications of characteristics of the earth formations surrounding the borehole, and means to correlate said depth indications with said indications of the characteristics of the earth formations, and by methods relating thereto.

These and other objects, features and advantages of the present invention will be apparent from the following detailed description taken with reference to the figures of the accompanying drawing, wherein:

Figure 1:
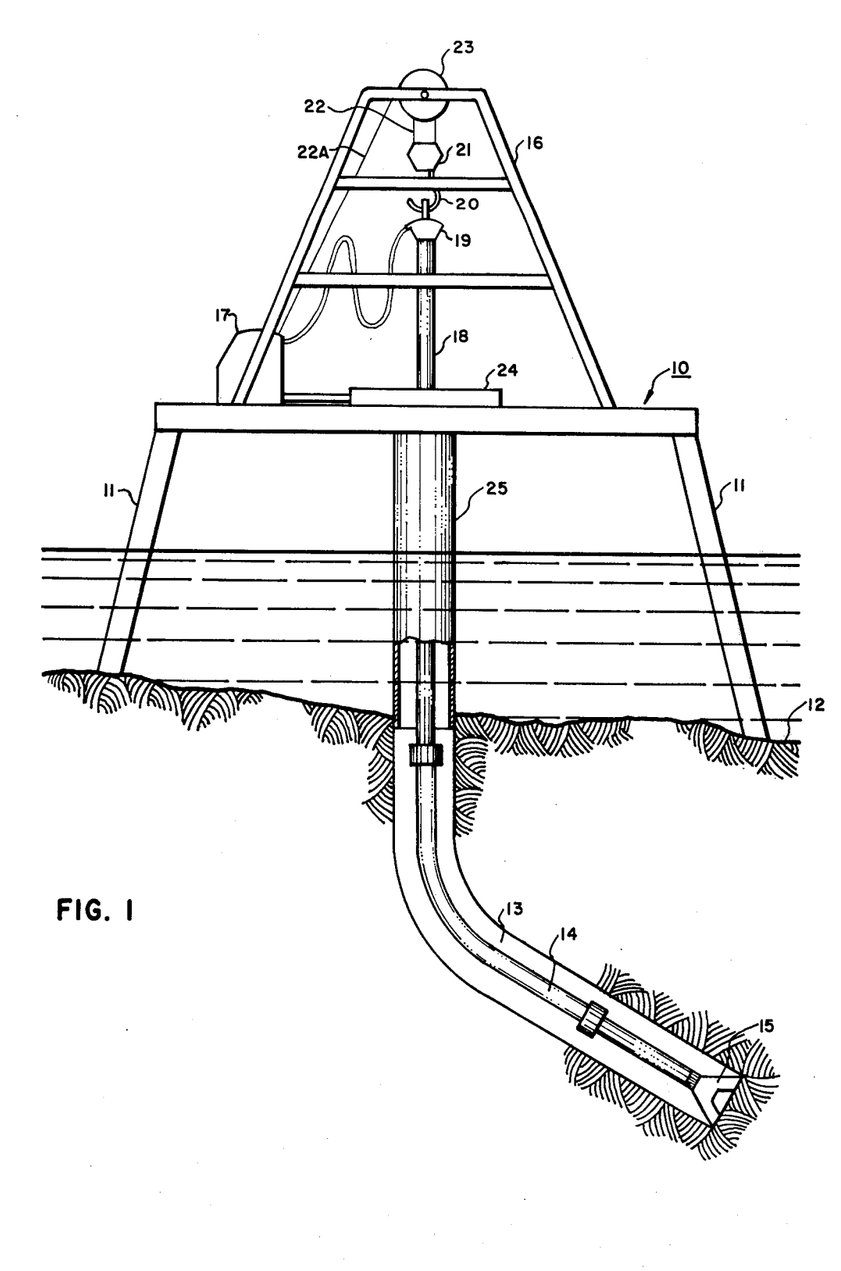
FIG. 1 is a schematic view illustrating the drilling of a deviated earth borehole from an offshore platform.

Referring now to the drawing in more detail, especially to FIG. 1, there is illustrated schematically a conventional system for drilling an earth borehole having a high degree of deviation from true vertical. As is well known in the art, it is common practice to drill such slanted wells from offshore platforms. A drilling platform 10 having a plurality of legs 11 anchored on the ocean floor 12 has an earth borehole 13 drilled therefrom. Within the borehole 13 is a pipe string 14, to the lower end of which is attached a drill bit 16. A surface casing 15 maintains the integrity of the borehole 13 as is well known in the art. A derrick 16 with its conventional drawworks 17 is mounted on the platform 10. The drill string 14 comprises a number of joined sections of pipe terminating at its upper end in a kelly 18, followed by a swivel 19, a hook 20 and a traveling block 21 suspended by a drilling line 22 from a crown block 23. The drawworks also drive a rotary table 24 which in turn transmits the drive to the kelly 18. One end of the line 22, namely the fast line 22a, is connected to the drawworks 17 which contains the motor or motors for manipulating the drill string. Although not illustrated, the other end of the drill line is secured to an anchor on the platform floor, that portion of the line extending to the anchor from the crown block being generally referred to as the dead line. Again not illustrated, such an anchor member normally would include a winding-on drum and can also, if desired, contain a dead line sensor for monitoring the weight on the bit, for example, as shown in U.S. Pat. No. 3,461,978 to F. Whittle, issued Aug. 19, 1969.

In the operation of the system according to FIG. 1, it is quite conventional in drilling wells from such offshore platforms to drill the initial portion of the well substantially along a vertical line from the platform and then to angle off in the further drilling of the well. Such wells after angling off will oftentimes be inclined at an angle of 60° to 70° from vertical. It is with these types of highly deviated wells that the problem presents itself as to providing a log on the formations surrounding the well bore.

Figure 2:
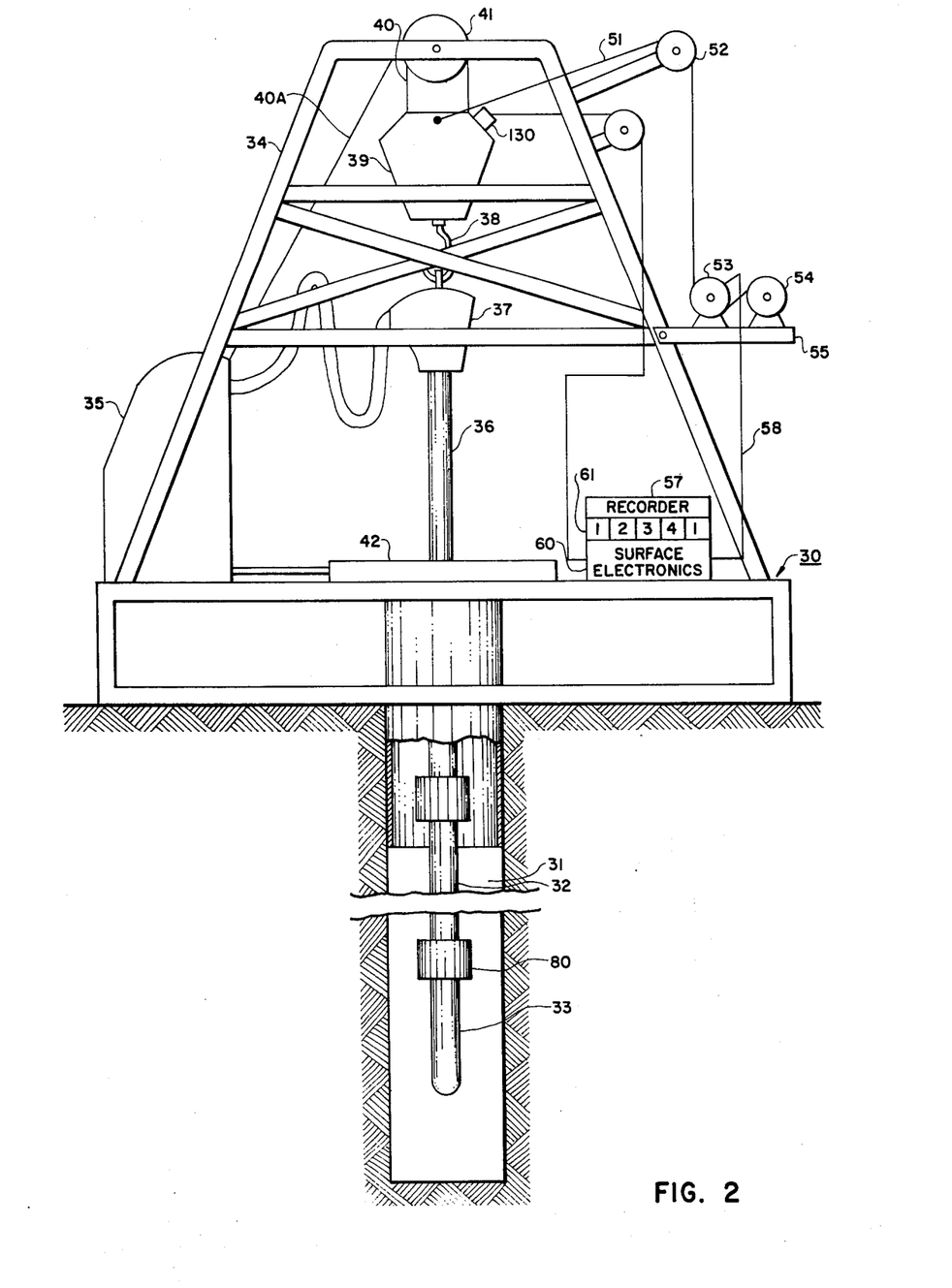
FIG. 2 is a schematic view illustrating an earth borehole drilled from an onshore rig wherein the well logging instrument has been pumped down the interior of the drill string in accordance with the present invention.

Referring now to FIG. 2, a drilling rig similar to that illustrated in FIG. 1, but which is mounted on the earth's surface, is illustrated for purposes of showing the well logging instrument attached to the drill pipe in accordance with the present invention. A drilling platform 30 is mounted on the earth's surface from which an earth borehole 31 has been drilled. The earth borehole 31 might or might not be slanted a substantial amount from vertical but is illustrated, for convenience, as being vertical. Within the borehole 31 is a pipe string 32, to the lower end of which is attached a logging instrument 33 which is illustrated in greater detail in FIG. 3 hereinafter. A derrick 34 with its conventional drawworks 35 is mounted on the platform 30. The drill string 32 comprises a number of joined sectons of pipe terminating at its upper end in a kelly 36, followed by swivel 37, a hook 38 and a traveling block 39 suspended by a drilling line 40 from a crown block 41. One end of the line 40, namely the fast line 40A, is connected to the drawworks 35 which contain the motor or motors for manipulating the drill string. The drawworks 35 also drive a rotary table 42 which in turn transmits the drive to the kelly 36.

Again not illustrated, and as discussed with respect to FIG. 1, the other end of the drilling line is normally attached to an anchor on the floor of the drilling platform 30.

Referring further to FIG. 2, there is illustrated a wireline 51 connected at one of its ends to the traveling block 39, passing over a wheel 52 mounted on the derrick 34. The wireline 51 then passes over a wheel 53 to a rewind drum 54, the wheel 53 being illustrated in more detail in FIG. 4. The wheel 53 and rewind drum 54 are each mounted on a support member 55 attached to the derrick 34, or some other suitable point. As is explained with respect to FIG. 4, the wheel 53 drives a pulse generator having a voltage output on conductor line 58 connected to the circuitry 60, bearing the legend "SURFACE ELECTRONICS". A visual depth monitor 61 and recorder 57 are mounted above the SURFACE ELECTRONICS circuitry 60. The SURFACE ELECTRONICS circuitry 60 generally comprises the circuits illustrated in FIGS. 4 and 6. An accelerometer 130 is also connected to the traveling block 39 and has its output connected into the circuitry 60.

Figure 3:
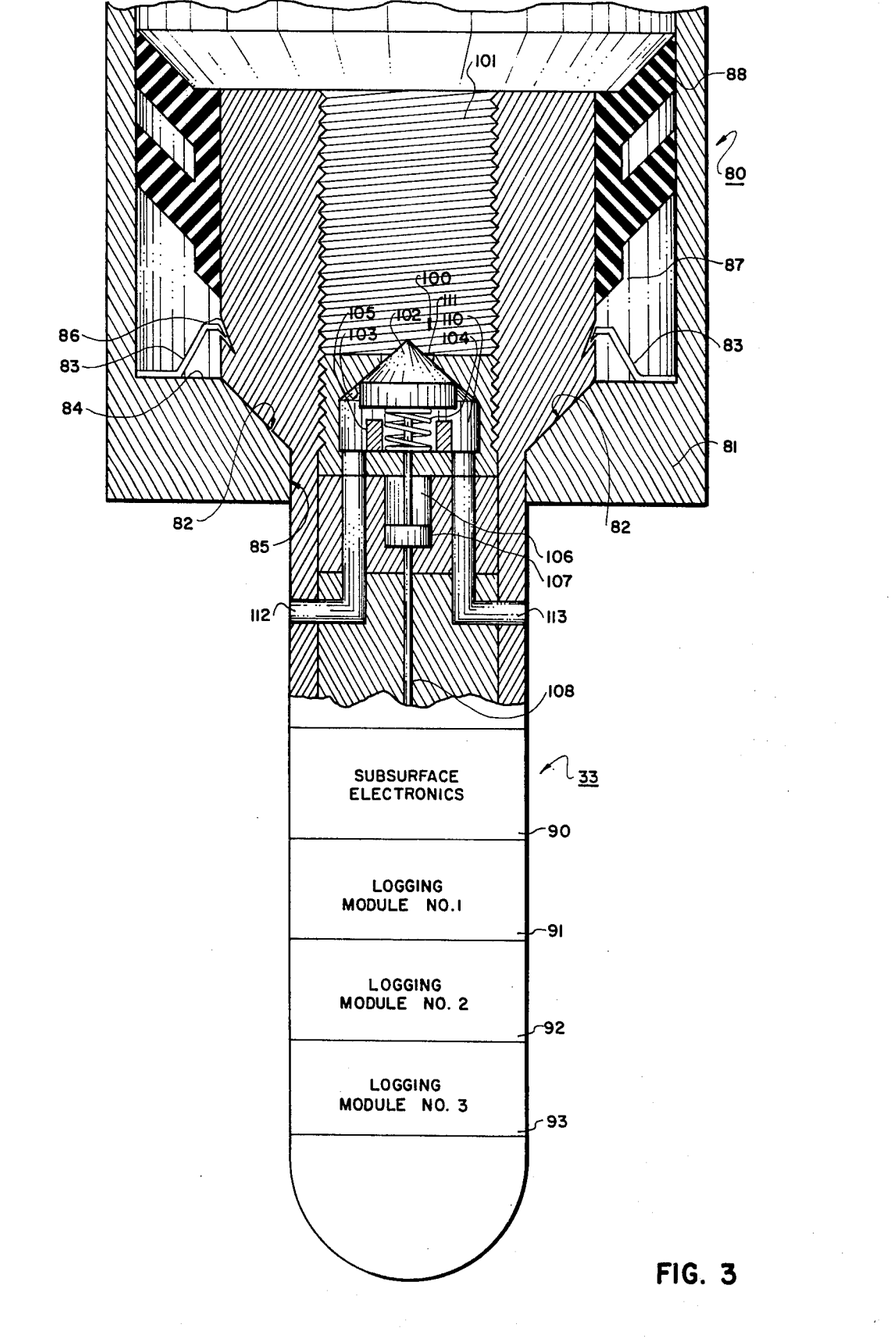
FIG. 3 is an enlarged schematic view, partly in cross section, illustrating the well logging instrument and lower catcher sub in the drill string in accordance with the present invention.

The operation of the system in accordance with FIG. 2 will be more readily understood taken in conjunction with the apparatus illustrated in FIG. 3. Suffice it to say at this point, that whenever it is desired to log the formation surrounding the borehole 31, the entire string of pipe 32 is pulled out of the borehole 31 and the drill bit, for example, as illustrated by the drill bit 15 in FIG. 1, is removed from the end of the drill string and then the drill string 32 is run back into the borehole 31. The logging instrument 33 is pumped down through the interior of the drill pipe 32 unitl it is caught by a special sub 80 at the lower end of the drill pipe string, again as illustrated in greater detail with respect to FIG. 3.

Figure 4:
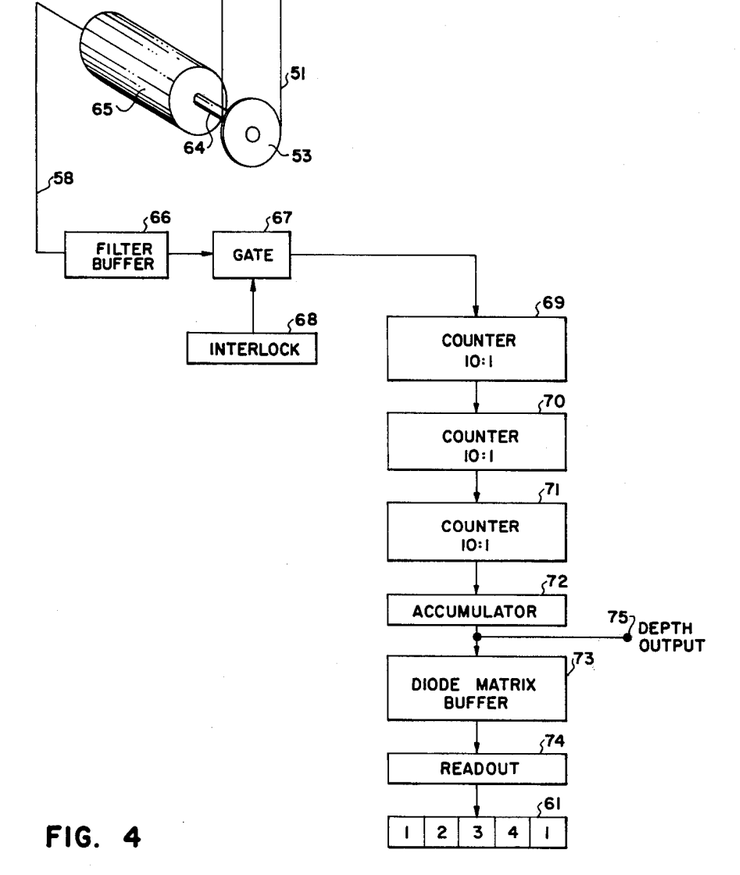
FIG. 4 is a schematic view, partly in block diagram, of a depth encoder used in accordance with the present invention.

Referring now to FIG. 4, there is illustrated the wheel 53, driven by the wireline 51, which in turn is adapted to drive the rotational encoder mechanism 65 which converts rotational movement (of the wheel 53) into electrical pulses. If desired, the encoder described in U.S. Pat. No. 3,426,303 to Guy O. Buckner, issued Feb. 4, 1969, and assigned to the assignee of the present invention, can be used for this purpose. Thus, as the wheel 53 turns, electrical pulses appear on conductor 58. By conventional gearing, the output of the encoder 65 produces 100 electrical pulses, each preferably having a square wave output, for each revolution of the shaft 64. The output of the apparatus 65 is coupled into a conventional filter and buffer section 66 and then into a gate circuit 67. Also coupled into the gate 67 is an interlock circuit 68, which may be, if desired, merely a manual switch which may be operated by the operator to close the gate 67 whenever the cable 51 reverses direction. Such an interlock is desirable to thus provide an electrical indication of travel only whenever the traveling block and kelly assembly is moving in the desired direction. If desired, however, the interlock circuitry 68 can be automatically responsive to the movement of the kelly in the desired direction and also act to close the gate 67 whenever the kelly is moving in that same direction, as, for example, through a one-way clutch. If desired, interlock circuit 68 can be made automatically responsive to a given speed of the drill bit, the weight on the bit or mud pressure, to name but a few examples.

It should be appreciated that when the borehole is being drilled, i.e., the drill bit is still attached to the drill pipe, and the drill pipe and drill bit are traveling in a downward direction, it is preferable to have gate 67 closed so an accurate determination can be made of the depth of the drill bit. In a similar manner, whenever the drill bit has been removed and replaced by the well logging instrument 33 as illustrated in FIG. 2, it is also desirable to have the gate 67 activated so that the depth of the logging instrument can be ascertained. In such cases, the interlock 68 and gate 67 can be bypassed so that the output of the filter buffer circuit 66 continuously feeds into the counter 69. The output of the gate 67 is connected to the input of the tandem counters 69, 70 and 71, each of these counters preferably having a 10:1 ratio. Thus, for each of the counters having such a ratio, for each ten pulses into the particular counter, only one pulse is seen on its output. The output of the counter 71 is coupled into a conventional accumulator circuit 72 which drives a diode matrix and buffer circuit 73 which in turn drives the readout section 74. The readout section 74 drives a visual depth monitor 61. The output of the accumulator circuit 72 has an additional output 75, bearing the legend "DEPTH OUTPUT".

In the operation of the circuit of FIG. 4, by proper gearing (not illustrated), the shaft 64 makes 20 revolutions for each 2 feet of travel of the cable 51. For each foot of travel, the shaft 64 makes 10 revolutions. Since the device 65 creates 100 pulses per revolution, the output of the device 65 is thus seen to be 1000 pulses per 1 foor of travel of the cable 51. Since the series of counters 69, 70 and 71 create a single output for each 1000 pulses in from the gate 67, it should be appreciated that the output of counter 71 is one pulse per each foot of travel of cable 51. The output of the accumulator 72, as represented by five decades of BCD readout having 21 lines, in then coupled into the diode matrix and buffer 73 to drive the readout circuit 74 and visual monitor 61. For reasons as set forth hereinafter, the "DEPTH OUTPUT" terminal 75 is connected to the circuitry of FIG. 6 for purposes of ascertaining the depth of the borehole logging instrument 33 as illustrated in FIG. 2.

Referring now to FIG. 3, the logging instrument 33 and catcher sub 80, illustrated generally in FIG. 2, are shown in greater detail. Although not illustrated, the upper portion of the catcher sub 80 is adapted to be threaded directly onto the lower end of the drill pipe 32. The catcher sub 80 is substantially cylindrical in shape, having its lower end closed in by the end-body portion 81 of sub 80 except for a funnel-like opening in its center, the funnel having an orifice 85 of slightly larger diameter than the cylindrically shaped lower portion of the logging instrument 33. The funnel, formed in the body 81, has downwardly and inwardly tapered surfaces 82 adapted to provide a metal-to-metal seal between such tapered surfaces and the similarly angled surfaces on portions of the logging instrument 33. A plurality of spring members 83 are attached to the planar surface 84 of the end-body 81 of the interior of the sub 80 for purposes of securing the borehole logging instrument 33 as it is being sealed to the tapered surfaces 82.

The well logging instrument 33, having a subsurface electronic section 90 and three conventional well logging modules 91, 92 and 93, bearing the legends, respectively, "LOGGING MODULE NO. 1", "LOGGING MODULE NO. 2", and "LOGGING MODULE NO. 3", has a lower end which is cylindrical in shape and is adapted to pass through the center orifice 85 of the catcher sub 80. The upper portion of the logging instrument 33 has a larger diameter, tapered to match the tapered surfaces 82 of the catcher sub which are tapered inwardly and downwardly toward the orifice 85. The portion of the logging instrument 33 above the tapered surfaces is substantially cylindrical in shape and has a continuous groove 86 around a portion of its periphery adapted to be engaged by the spring members 83 for latching the logging instrument in place during the time that it is being sealed against the tapered surfaces 82. In addition, a rubber sealing element 87 is formed in an encircling manner around the upper periphery of the well logging instrument 33 to enable the instrument to be pumped down through the drill string. The sealing element 87 has a plurality of flexible fingers 88 which enables the device to be pumped through portions of the drill pipe and collars having internal diameters of varying dimensions.

A spring-loaded valve assembly 100 is threadedly engaged with a central bore 101 of the upper portion of the logging instrument 33. The valve assembly includes a valve 102, a valve seat 103, a spring 104 and a spring housing 105. The valve 102 is located within a central chamber 110 having an upper opening 111 and a pair of lower channels 112 and 113. A central shaft 106 is connected to the lower side of the valve 102 through the interior of the spring 104 and is adapted to move as the valve 102 moves. The lower end of the shaft 106 is connected to an electrical microswitch 107, located within a cavity beneath the valve assembly, which is sealingly isolated from the flow of pumped fluids as hereinafter described. A conduit 108 connected to the microswitch 107 allows a pair of electrical wires to travel from the microswitch 107 to the subsurface electronics section 90 as hereinafter described with respect to FIG. 5.

In operation of the well logging instrument 33 and catcher sub 80 as hereinbefore described, the drill string having the catcher sub 80 installed on the lower end of the drill pipe 32, is first lowered into the borehole 31 of FIG. 2. The string of drill pipe is made up and lowered until the lower end of the drill pipe and the catcher sub 80 are located at some desired or predetermined depth. The logging instrument 33 is then inserted into the interior of the drill string at the earth's surface and is pumped down using the conventional mud pumping equipment used as a normal circulation means in drilling an earth borehole. While the instrument is being pumped down inside the interior of the drill pipe, the valve 102 is maintained closed by the spring 104. It should be appreciated that once the logging instrument is sealed against the catcher sub 80, the strength of the spring 104 must relate to the hydrostatic pressure of the column of drilling mud or other circulation fluid which is being used to pump down the instrument. When the instrument 33 finally arrives at the catcher sub 80, the lower end of the instrument 33 will pass through the center orifice 85 and the tapered surfaces of the logging instrument 33 will seal against the matching or mated tapered surfaces 82 or the catcher sub 80. Although the matching tapered surfaces can provide a metal-to-metal seal, those skilled in the art will recognize that additional sealing means, such as rubber, can be used to insure the integrity of the seal. In addition, as the instrument is being sealed against the tapered surfaces 82, the spring members 83 will snap in place into the groove 86 around the periphery of the logging instrument 33 to secure the instrument in place.

At this point in time, the spring 104 acts against the hydrostatic pressure of the column of drilling mud and maintains the valve 102 closed against the valve seat 103. By increasing the pumping pressure of the drilling mud, the spring 104 is overcome, the valve 102 moves down and the drilling mud passes through the center orifice 111 to the channels 112 and 113 and thus into the borehole. By this means, circulation is re-established. At the same time, the shaft 106 moves within the microswitch 107 to complete the electrical circuit as explained hereinafter with respect to FIG. 5.

Figure 5:
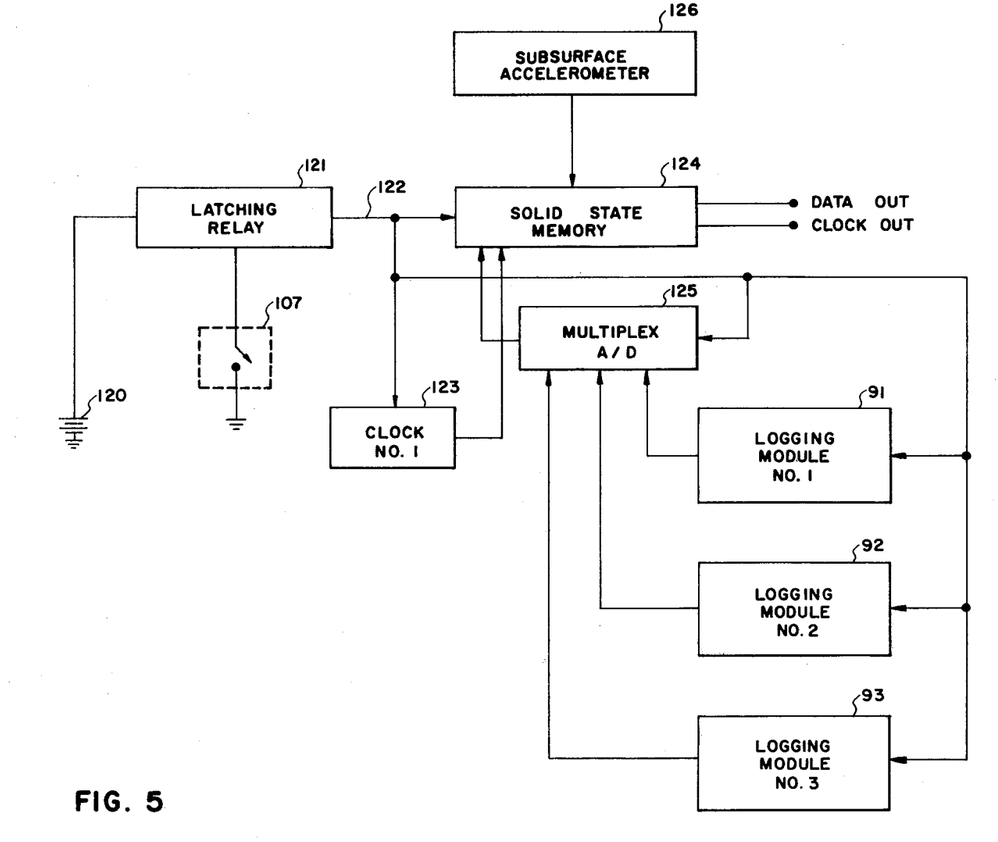
FIG. 5 is a block diagram of the electrical circuitry utilized in the well logging instrument in accordance with the present invention.

Referring now to FIG. 5, the electrical circuitry utilized within the well logging instrument 33 of FIG. 3 is shown in block diagram. It should be appreciated that since the well logging instrument 33 is self-contained, i.e., does not have an electrical cable connecting it with the earth's surface, the entire electrical supply must come from the well logging instrument itself. This is provided by a battery 120 which has its positive side connected through a latching relay 121. The latching relay is activated by the operation of the microswitch 107 illustrated in FIG. 3. Once activated by the microswitch 107, the relay 121 remains activated until manually deactivated at the earth's surface. Thus, as the microswitch 103 is activated by movement of the valve 102 in response to increased pump pressure, the latching relay 121 is activated and the positive side of the voltage 120 is thus seen on the cnductor 122. The voltage appearing on conductor 122 is coupled into a clock 123, bearing the legend "CLOCK NO. 1", into a solid state memory circuit 124, into the LOGGING MODULES NO. 1, NO. 2 and NO. 3, and into a conventional multiplex analog-to-digital converter 125. The LOGGING MODULES NO. 1, NO. 2, and NO. 3 have their outputs connected into inputs of the multiplex analog-to-digital converter 125, whose output in turn is connected into a solid state memory circuit 124. The output of the clock 123 is also connected into an input of the solid state memory circuit 124. A subsurface accelerometer 126 is also located within the borehole logging instrument 33 and generates a signal which is connected to the solid state memory circuit 124.

In operation, all of the circuitry of the logging instrument 33 is maintained in the de-energized position while the instrument is being pumped down inside the drill pipe string. Whenever the instrument is sealed at the lower end of the catcher sub 80, the microswitch 107 is activated and the voltage from the battery 120 is connected into the input of the solid state memory circuit 124. This voltage places the memory circuit in the "STANDBY" mode. As the drill pipe is then removed from the hole, that is, the drill pipe starts up the hole pulling the logging instrument with it, the subsurface accelerometer 126 generates a signal which then causes the solid state memory circuit to switch from "STANDBY" to the "ON" position. Thus, the multiplexed and digitized signals from the logging modules are coupled into the solid state memory circuit only in response to the movement of the drill pipe. Simultaneously, the output pulses from the clock 123 are coupled into the solid state memory circuit 124. As is conventional in the pulling of drill pipe, a plurality of drill pipe sections, usually three, are pulled out of the hole and swung out of the way. When this happens, the accelerometer 126 is no longer generating a signal and the solid state memory circuit converts back from the "ON" state to the "STANDBY" state. Thus, it should be appreciated that the only time that logging signals and the clock signals from the clock 123 are going into the solid state memory is whenever the pipe is moving. This sequence is repeated each time the pipe starts moving again, for example, every time three more sections of the drill pipe are pulled out of the hole.

Figure 6:
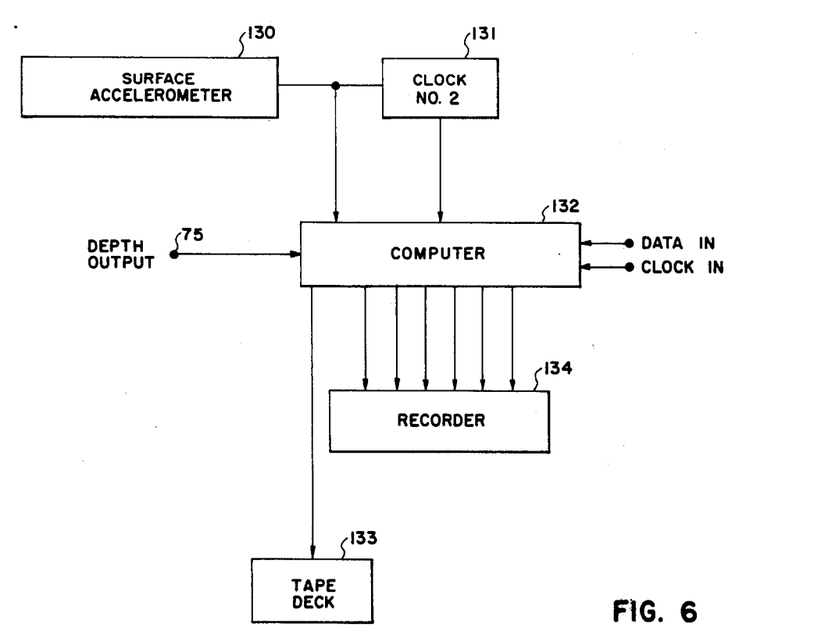
FIG. 6 is a block diagram of the surface electronics in accordance with the present invention.

Referring now to FIG. 6, there is illustrated in greater detail the surface electronics circuitry 60 illustrated generally in FIG. 2. The circuitry includes a surface accelerometer 130 which is mounted on the traveling block 39 of FIG. 2. The surface accelerometer has its output connected to a clock 131, beating the legend "CLOCK NO. 2" which has a frequency output which is either identical to that of CLOCK NO. 1 of the subsurface instrument, or has some known relationship thereto. The output of the surface accelerometer 130, as well as the output of the clock 1331, is connected to a computer 132, for example, a mini-computer stationed preferably at the well location. The depth output 75 is also connected to one of the inputs of the computer 132. The output of the computer is coupled into a tape deck 133 and also has six outputs connected into a recorder 134 having visual printouts such as the six recordings illustrated in FIG. 7.

In the operation of the circuitry in FIG. 6, after the well logging instrument is finally retrieved from the borehole, the data-out and clock-out outputs of the solid state memory circuit 124 are connected into the data-in and clock-in inputs of the computer 132.

Figure 7:
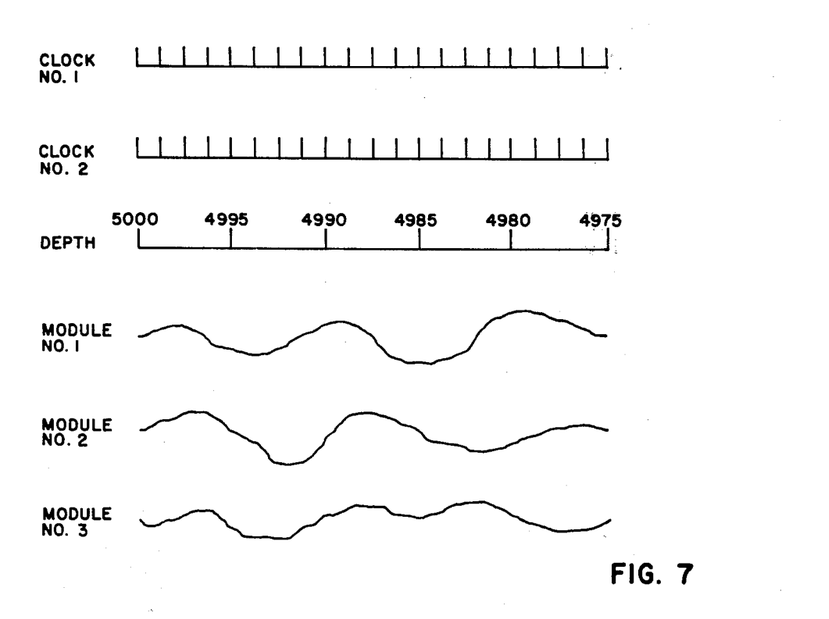
FIG. 7 schematically illustrates representative waveforms recorded at the earth's surface in accordance with the present invention.

In observing the overall operation of the system, taken in conjunction with the characteristic displays illustrated in FIG. 7, it should be appreciated that after the borehole instrument 33 has been pumped down the pipe string and has activated the microswitch 107 to place the solid state memory circuitry in "STANDBY", the system is ready to begin logging the borehole. As soon as the drill pipe starts being pulled out of the well, both the surface accelerometer and the subsurface accelerometer produce signals because of the movement of the pipe. This in turn causes the CLOCK NO. 1 and CLOCK NO. 2, respectively, to generate clock signals, preferably of the same frequency. Coincident with the generation of signals by the two clocks, depth signals are also obtained and recorded. In addition, the logging signals in the three modules are recorded by the solid state memory circuit. At the end of the logging run, after the solid state memory circuit is retrieved from the borehole and its outputs coupled into the computer 132, all that is required to synchronize the logging data with the depth data is to synchronize the beginning of the signals from CLOCK NO. 1 with the beginning of the signals from CLOCK NO. 2. In this manner, the logging data can be correlated with the depth data to indicate characteristics of formations surrounding the borehole at a given depth.

The preferred embodiment of the present invention contemplates the well logging instrument being pumped down the interior of the drill pipe after the drill pipe is in place in the borehole and then being seated in the catcher sub at the bottom of the drill pipe. However, the invention also contemplates the logging instrument being attached to the bottom end of the drill string prior to its being run into the hole. With such a system, by using an accelerometer that is sensitive only to upward motion of the drill pipe, the movement of the logging instrument and drill pipe while going into the hole will not cause the recording system to be operative. However, when the logging instrument is at the desired depth, the drill pipe can then be pulled out of the ground and the formations logged in the same manner as was discussed heretofore with respect to the pumped down instrument.

Figure 8:
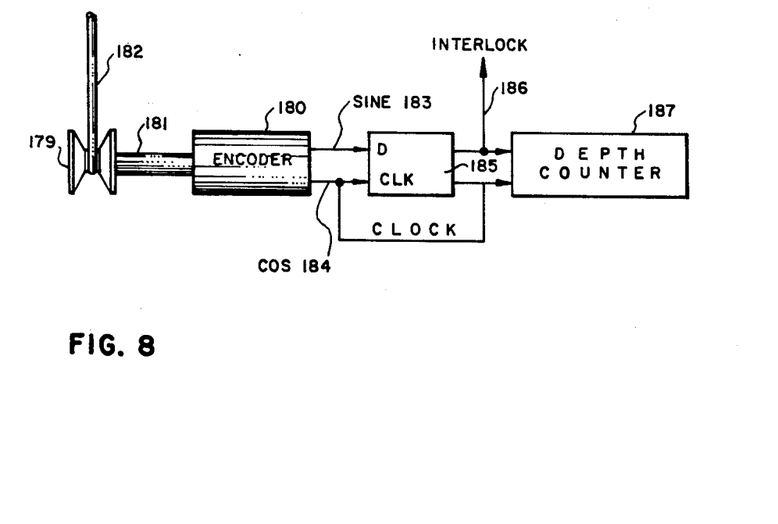
FIG. 8 schematically illustrates an alternative embodiment of apparatus and circuitry at the earth's surface for measuring the depth of pipe or tubing within an earth borehole.

Referring now to FIG. 8, an alternative embodiment is illustrated of apparatus which can be used to measure a pipe or tubing travel at the surface of the earth. A shaft encoder 180 having a rotating shaft 181 is connected to a sheave 179 over which a cable 182 passes and which causes the sheave 179 and shaft 181 to rotate. The cable 182 can be connected, for example, to the traveling block 39 as illustrated in FIG. 2 to thereby be indicative of movement of the drill pipe or tubing as the case may be. The shaft encoder 180 is conventional and produces a biphase output identified as the sine 183 and the cos 184. These two outputs of the encoder are connected, respectively, into the "D" and the "CLK" of J-K flip-flop circuit 185. The cos signals 184 is also connected to a depth counter 187 which has an additional input from the output of the flip-flop circuit 185 to thereby drive the depth counter 187. The input to the depth counter is also connected by means of conductor 186 to an interlock circuit, if desired, to be used as is the interlock circuit 68 of FIG. 4. Such a shaft encoder with biphase output can thereby provide all the signals required to keep track of pipe travel and direction. An up/down indication is derived electronically from the sine and cos signals and is used, if desired, to control the interlock circuit.

Figure 9:
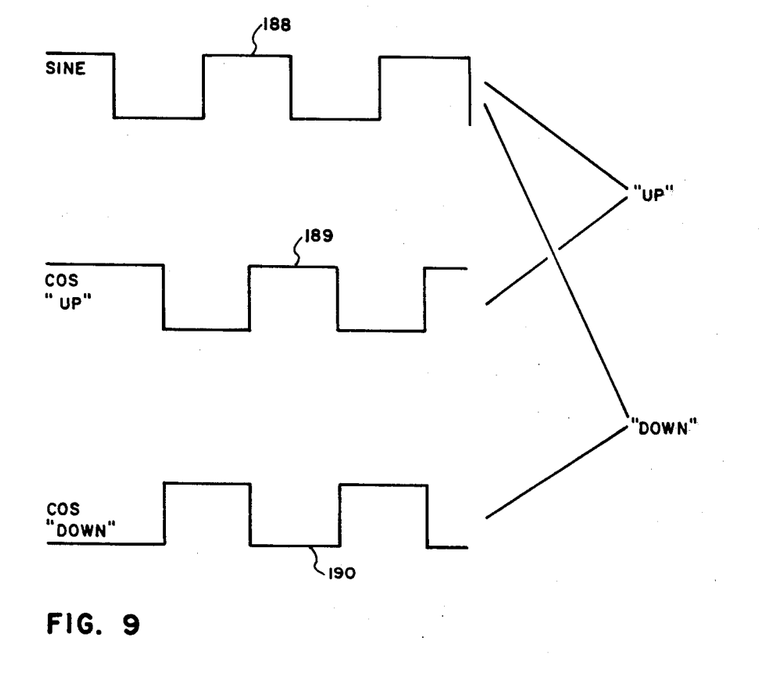
FIG. 9 illustrates representative waveforms found in the circuitry of FIG. 8.

FIG. 9 schematically illustrates a sine square wave 188, the cos "UP" square wave 189 and the cos "DOWN" square wave 190. It should be appreciated that the cos signals are 90° out of phase with the sine signals and that the cos UP and cos DOWN square waves are 180° out of phase with each other. In the operation of the circuitry of FIG. 8, as illustrated in FIG. 9, the square waves 188 and 189 are combined for an "UP" signal and the square waves 188 and 190 are combined for a "DOWN" signal.

Figure 10:
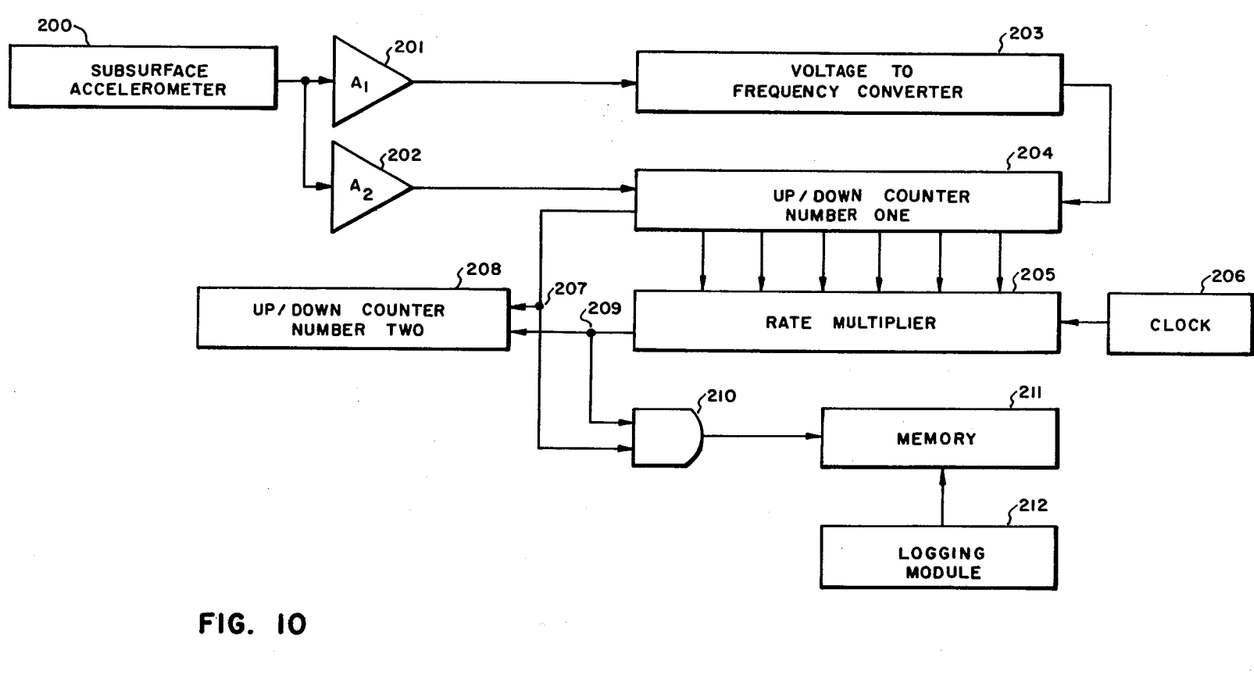
FIG. 10 is a block diagram of circuitry according to an alternative embodiment of the invention.

Referring now to FIG. 10, there is schematically illustrated alternative circuitry for the downhole recording of well logging information which is indicative of, or at least functionally related to, the characteristics of the formations surrounding the borehole. It should be appreciated that the objective of this circuitry is to record samples at equidistant depth intervals regardless of the logging speed. A combination of an accelerometer and clock allows computation of the distance traveled by the logging instrument.

As is well known, acceleration $a$ is related to distance $s$ by the relationship: $a = d^2s/dt^2$. By integrating twice, the distance traveled is obtained.

The circuitry which is used to measure depth (or distance) is schematically illustrated in FIG. 10. A subsurface accelerometer 200 having a variable output dependent upon the acceleration has its output coupled into an amplifier $A_1$, referred to generally by the numeral 201, and also is coupled into amplifier $A_2$, referred to generally by the numeral 202. The amplifier $A_1$ produces an absolute value of the voltage output of the accelerometer 200 to thereby maintain the input to the voltage-to-frequency converter 203 positive regardless of the sign of the accelerator voltage. The amplifier 202 is a comparator to control the UP/DOWN mode of the UP/DOWN counter number 1, referred to generally by the numeral 204. The outputs of the UP/DOWN counter number 1 are coupled into a rate multiplier circuit 205 which is driven by a clock 206. The output of the rate multiplier is coupled into a junction 209 which in turn is coupled into an UP/DOWN counter number 2, referred to generallly by the numeral 208. The UP/DOWN counter number 1 has an output which is also coupled into the terminal 207 which in turn is coupled into the input of the UP/DOWN counter number 2. The terminals 207 and 209 are also coupled into the inputs of a gate 210 whose output is coupled into a memory circuit 211, for example, like the solid state memory circuit 124 in FIG. 5. A logging module 212 which can be any of the various conventional well logging modules known in the art, has its output connected into the memory circuit 211. Such logging modules, for example, can measure resistivity, acoustic travel time, natural radioactivity, etc.

In the operation of the circuitry of FIG. 10, it should be appreciated that, at least in principle, one can integrate the acceleration measured by the accelerometer 200 to obtain velocity. Moreover, the circuiry of FIG. 10 closely approximates that integration by using a voltage-to-frequency converter 203 in conjunction with a bi-directional counter 204. Although the circuit does not provide a true integration but rather an incremental summation, the drift problems with such circuitry are less severe. With the transfer function of a voltage-to-frequency converter, F equals to $K_1 E_1$, where F equals frequency, $K_1$ is a constant and $E_1$ is the output of the amplifier 201.

The number of output pulses of the converter 203 is thereby equal to: $N = K_1 E T$ where N is the number of pulses and T is the time.

The number of pulses $N_2$ accumulated in counter 204 at time $T_2$ will be: $N_2 = K_1 E_1 (T_2 - T_1) + N_1$.

Substituting acceleration $A = \Delta V/\Delta T$ and a scale factor $K_2$ for $K_1 E_1$ and $(T_2 - T_1) = \Delta T$:

$$N_2 - N_1 = K_2 \Delta V.$$

The accumulated number in the counter 204 is therefore proportional to velocity. The integration of velocity is thereafter performed by the rate multiplier 205 and the counter 208.

Thus, the output of the rate multiplier 205 as found on the terminal 209 and which drives the gate 210 causes pulses to be generated by the gate 210 and thus be recorded in the memory 211 indicative of depth pulses. Therfore, when information is recorded in the memory 211 from the logging module 212, it is recorded as a function of depth within the borehole. With this apparatus method, no depth counters or accelerometers are required at the surface. However, simultaneous surface recording of pipe travel and acceleration as set forth in the previous embodiments allows corrections and/or correlations of downhole records if desired.

Figure 11:
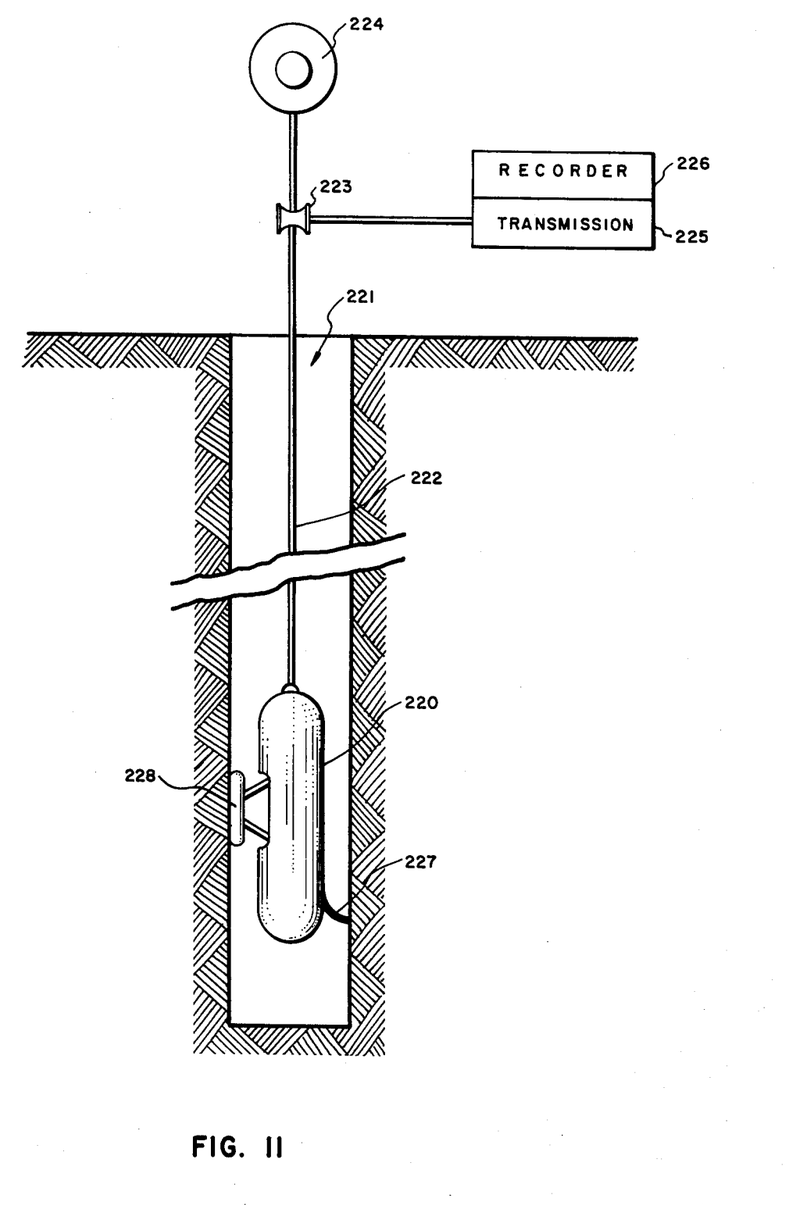
FIG. 11 is a schematic view of an alternative embodiment for causing the apparatus to the invention to traverse an earth borehole.

Referring now to FIG. 11, an alternative means is described for causing the borehole instrument 220 to traverse the earth borehole 221. A cable 222 which is connected to the top portion of the instrument 220 passes over a measuring sheave 223 at the earth's surface and is reeled onto a hoisting drum 224 as is conventional in the art of well logging. The sheave 223 is connected to a transmission 225 which drives a surface recorder 226. The instrument 220 can be of any conventional nature for logging earth boreholes but, for convenience, is illustrated as having a centralizer spring 227 and a retractable pad section 228 which is pressed against the earth formation as is well known in the art.

In the operation of the apparatus of FIG. 11, as the instrument 220 traverses the earth borehole while logging the characteristics of the formations surrounding the borehole, the apparatus and circuitry of FIG. 10 can be embodied therein to record such indications of the characteristics of the earth formations as functions of depth without transmitting any signals over the cable 222. Thus, the cable 222 need not be concerned with having electrical conductors unless otherwise needed.

In utilizing the circuitry of FIG. 10, it should be appreciated that a "low battery" detector can be a part of the system if desired so that the data in the memory 211 is not lost because of a weak battery. The time required to return the instrument to the surface could exceed the logging time in many cases. Battery life can be extended by maintaining power to the memory only while the instrument is moving and activated, for example, as by the use of the activation circuitry of FIG. 5.

Figure 12:
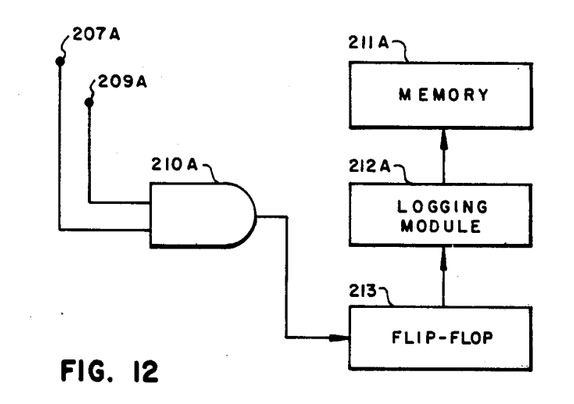
FIG. 12 is a block diagram illustrating circuitry according to yet another embodiment of the invention.

Referring now to FIG. 12, an alternative embodiment of a portion of the circuitry of FIG. 10 is illustrated. The junctions 207A and 209A, corresponding to junctions 207 and 209 of FIG. 10, respectively, are coupled into a gate 210A whose output pulses drive a flip-flop circuit 213. The flip-flop 213 produces a pulse out having a predetermined pulse width, for example, one second in duration, for each pulse in from the gate 210A. The pulses from the flip-flop 213 are coupled into the logging module 212A, which in turn has its output connected to the memory device 211A.

In the operation of the circuit according to FIG. 12, taken in conjunction with FIG. 10, the double integrated acceleration produces depth-related pulses from gate 210A, which in turn produce sampling pulses of a given width from the flip-flop 213. These sampling pulses thus sample the logging module at predetermined depth intervals as determined by the circuitry of FIG. 10. Thus, if the circuitry of FIG. 10 causes a pulse to be generated every 5 feet by gate 210 (or 210A), then logging module 212 will be sampled every 5 feet for a period of 1 second (the length of each pulse from the flip-flop 213). The logging information, preferably digital, can thus be stored in the memory 211A, either serially, parallel or otherwise, and the logging information is thus stored as a function of depth. With this type of sampling and storage, the depth pulses can be recorded if desired but are not necessary to correlate depth with the logging data.

Thus it should be appreciated that the preferred embodiment of methods and apparatus for logging a well using self-contained logging instruments has been described herein. Obvious modifications to the preferred embodiment will be apparent to those skilled in the art from a reading of the foregoing detailed specification and drawing. For example, instead of using drill pipe to pump the instrument down to the bottom of the well bore, tubing can be used such as is used in the production of oil and gas wells. Furthermore, additional techniques can be used to conserve the memory capacity in the well logging instrument. For example, the data can be compressed and only the difference between subsequent samples stored. It should be appreciated that although solid state memory is preferred because of the reduction of power consumption and also the thermal isolation from the borehole temperatures which can be achieved, other memory devices such as tape recorders can be used in the downhole instrument if power is available. Likewise, although the preferred embodiment contemplates that the true depth measurement, which of course can be corrected for pipe stretch using conventional methods, is taken from the accumulator 72, it can also be taken elsewhere in the circuit of FIG. 4, depending upon the footage pulses desired for given depth increments.

The embodiments of the invention in which an exclusive property or privilege is claimed are defined as follows:

1. Apparatus for investigating the formations surrounding an earth borehole, comprising:
   an elongated instrument adapted to traverse an earth borehole;
   means within said instrument for measuring at least one characteristic of the formations surrounding said borehole and for generating first signals functionally related to said at least one characteristic;
   a variable-output accelerometer within said instrument for generating second signals functionally related to the acceleration of said instrument while traversing an earth borehole;
   circuit means within said instrument for translating said second signals into third signals functionally related to the depth of the instrument within an earth borehole; and
   means within said instrument for recording said first and third signals.

2. Apparatus for investigating the formations surrounding an earth borehole, comprising:
   an elongated instrument adapted to traverse an earth borehole;
   means within said instrument for measuring at least one characteristic of the formations surrounding said borehole and for generating first signals functionally related to said at least one characteristic;
   circuit means within said instrument for generating second signals dependent upon the acceleration of said instrument while traversing an earth borehole, said second signals being functionally related to the depth of the instrument in the borehole; and
   means within said instrument for recording said first and second signals, whereby said first signals are recorded as a function of depth in the borehole.

3. The apparatus according to claim 2, including in addition thereto, means for causing said instrument to traverse an earth borehole.

4. The apparatus according to claim 3, wherein said traversal means comprises a cable attached between the instrument and hoisting means at the earth's surface.

5. The apparatus according to claim 3, wherein said traversal means comprises tubular means attached between the instrument and hoisting means at the earth's surface.

6. Apparatus for investigating the formations surrounding an earth borehole, comprising:
   an elongated instrument adapted to traverse an earth borehole;
   means within said instrument for measuring at least one characteristic of the formations surrounding said borehole and for generating first signals functionally related to said at least one characteristic;
   a variable-output accelerometer within said instrument for generating second signals functionally related to the acceleration of said instrument while traversing an earth borehole;
   memory means within said instrument; and
   means to gate said first signals into said memory means as a function of said second signals.

7. Apparatus for investigating the formations surrounding an earth borehole, comprising:
   an elongated instrument adapted to traverse an earth borehole;
   means within said instrument for measuring at least one characteristic of the formations surrounding said borehole and for generating first signals functionally related to said at least one characteristic;
   circuit means within said instrument for generating second signals dependent upon the acceleration of said instrument while traversing an earth borehole, said second signals being functionally related to the depth of the instrument in the borehole;
   memory means within said instrument; and
   means to gate said first signals into said memory means as a function of said second signals.

8. A method of logging the formations surrounding an earth borehole, comprising:
   traversing an earth borehole with a well logging instrument and measuring at least one characteristic of the formations surrounding said borehole;
   generating first signals indicative of said measurements;
   monitoring the acceleration of said well logging instrument and generating depth signals responsive to said acceleration; and
   gating said first signals into a memory device in response to said second signals.

* * * * *